United States Patent

Michel et al.

[11] Patent Number: 5,880,882
[45] Date of Patent: Mar. 9, 1999

[54] SCALE AND METHOD FOR MAKING A SCALE

[75] Inventors: Dieter Michel, Traunstein; Georg Flatscher, Schneizlreuth, both of Germany

[73] Assignee: Dr. Johannes Heidenhain GmbH, Traunreut, Germany

[21] Appl. No.: 764,984

[22] Filed: Dec. 13, 1996

Related U.S. Application Data

[63] Continuation of Ser. No. 192,681, Feb. 7, 1994, abandoned.

[30] Foreign Application Priority Data

Feb. 11, 1993 [DE] Germany .................. 43 03 975.8

[51] Int. Cl.⁶ .................. G02B 27/02; G02B 5/30
[52] U.S. Cl. .................. 359/436; 359/566; 359/572; 359/576; 250/237 G
[58] Field of Search .................. 359/360, 436, 359/437, 439, 572, 576, 582; 250/237 G

[56] References Cited

U.S. PATENT DOCUMENTS

| | | | |
|---|---|---|---|
| 3,521,961 | 7/1970 | Heidenhain et al. | 356/375 |
| 3,629,945 | 12/1971 | Liuzzo et al. | 33/107 R |
| 3,739,271 | 6/1973 | Wetzel | 359/439 |
| 4,226,082 | 10/1980 | Nishida | 368/285 |
| 4,442,166 | 4/1984 | Fan | 359/360 |
| 4,556,277 | 12/1985 | Fan et al. | 359/360 |
| 4,708,437 | 11/1987 | Kraus | 359/572 |
| 4,772,080 | 9/1988 | Tustison | 359/360 |
| 5,179,469 | 1/1993 | Hall et al. | 359/360 |
| 5,377,044 | 12/1994 | Tomono et al. | 359/572 |
| 5,377,045 | 12/1994 | Wolfe et al. | 359/585 |
| 5,413,864 | 5/1995 | Miyazaki et al. | 359/360 |
| 5,507,870 | 4/1996 | Siebert | 118/664 |

FOREIGN PATENT DOCUMENTS

| | | | |
|---|---|---|---|
| 0112509A2 | 7/1984 | European Pat. Off. | G03F 1/00 |
| 2 676 538 | 11/1992 | France | G01D 5/26 |
| 26 15 473 | 10/1977 | Germany | G01K 7/18 |
| 2225449 | 5/1990 | United Kingdom | 359/582 |

OTHER PUBLICATIONS

Rancourt, J., *Optical Thin Films User's Handbook*, Macmillan Publishing Company, pp. 45–48, 1987.

Pulker, H.K., *Coatings on Glass*, Basic Research Laboratory, pp. 348–351 (4 pages), 1984.

English Abstract of Japanese Patent Publication No. 58–75004 entitled "Reflective Scale for Photoelectric Displacement Detector and its Production," 2 pages, 1983.

English Abstract of Japanese Patent Publication No. 63–184708 entitled "Thin Film Optical Circuit," 2 pages, 1988.

English Abstract of Japanese Patent Publication No. 3–38624 entitled "Wiring Electrode," 2 pages, 1991.

"Glass Scale Technology—An Exercise in Precision," *Tooling Production*, vol. 54, No. 3, pp. 49–51 (Jun. 1988).

*Primary Examiner*—Cassandra Spyrou
*Assistant Examiner*—John Juba, Jr.
*Attorney, Agent, or Firm*—Brinks Hofer Gilson & Lione

[57] ABSTRACT

A scale for opto-electrical linear or angular measuring systems. A gradation in the form of a phase grating is embodied on the scale and has alternating raised and stepped areas. A continuous compensating layer of chrome and on it a continuous highly reflective layer of titanium nitride are applied to one side of a step-like structured base body. The material and the layer thickness of the compensating layer is selected in such a way that it counteracts the mechanical stresses of the reflecting surface layer and thus, in the finished state of the scale, the deposited layers no longer exert stresses on the base body.

14 Claims, 3 Drawing Sheets

SCALE AND METHOD FOR MAKING A SCALE

This application is a continuation of application Ser. No. 08/192,681, filed Feb. 7, 1994, now abandoned.

FIELD OF THE INVENTION

The invention relates to a scale, in particular, a scale for linear or angular measuring systems operating by incident light and a method for making a scale.

BACKGROUND OF THE INVENTION

Opto-electrical position measuring devices may be used for measuring the relative position of two movable objects. The objects which are movable with relation to each other may be two machine parts of a machine tool, for example, which require the positioning of one tool with relation to a workpiece to be processed. For this purpose a scale is connected with one machine part, the gradation of which is scanned by a scanning unit disposed on the other machine part.

The scale has a base body preferably formed of glass. The graduation is applied to the base body in one of two ways. If the scale is employed with linear or angular measuring systems operating by transmitted light, the graduation is applied to the base body in the form of alternating transparent and opaque areas. If the scale is employed with linear or angular measuring systems operating by incident light, the graduation is applied to the base body in the form of alternating reflecting and non-reflecting areas. With either the transmitted or incident light operation, the graduation may be embodied as an amplitude or phase grating.

With amplitude and phase gratings utilizing incident light, a highly-reflective continuous layer is applied to the base body. It has been shown that mechanical stresses appear in this layer and because of these stresses, the base body becomes deformed. With linear or angular measurements it is required that during scanning, a constant distance between the scale and the scanning unit be maintained over the entire length of the scale. If the scale curves because of stresses caused by the reflecting layer, the scanning distance changes along the length of the scale which causes measuring errors.

European Patent Publication EP 0 112 509 A2 discloses a radiation mask for X-ray lithography intended to prevent deformation by means of a symmetrical layer structure.

SUMMARY OF THE INVENTION

According to a first aspect of the invention, there is provided a scale wherein the layer structure has been selected to be such that no stresses, which result in bending of the base body, are exerted on the base body.

According to another aspect of the present invention, there is provided a base body and a first layer substantially in contact with a first surface of the base body and a graduation formed by at least a second layer disposed on top of the first layer. The first layer is selected so as to isolate the first surface of the base body from stresses in the second layer.

The invention itself, together with objects and attendant advantages, will best be understood by reference to the following detailed description taken in conjunction with accompanying drawings. It should be understood, however, that this description is to be illustrative rather than limiting, the scope of the invention being defined by the appended claims and equivalents thereof.

DETAILED DESCRIPTION OF THE PRESENTLY PREFERRED EMBODIMENTS

Figure 1:
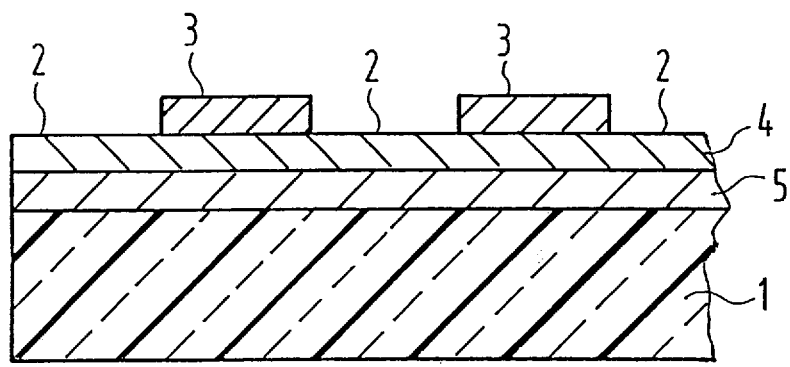
FIG. 1 is a cross-section of a scale with an amplitude grating according to a first preferred embodiment of the present invention.

The scale illustrated in FIGS. 1 through 6 are used as a measurement representation in an opto-electrical linear or angular measuring system operating by incident light. FIG. 1 is a cross-section of a scale with an amplitude grating according to a first preferred embodiment of the present invention. A gradation of alternatingly light-reflecting areas 2 and non-light-reflecting areas 3 is provided on a base body 1 preferably made of glass. The non-reflecting or absorbing areas 3 are preferably strip-shaped chrome oxide deposits. The reflecting areas 2 are preferably formed by a continuous, reflecting layer 4 of titanium nitride (TiN). A compensating layer 5 preferably of chrome (Cr) is assigned to this layer 4 to avoid tensile stresses. Both continuous layers 4 and 5 are sequentially applied to one side of the base body 1. This layer combination is particularly advantageous because the TiN layer 4, which is in contact with the absorbing areas 3 is highly reflective and the chrome layer 5 located underneath the TiN layer 4 is particularly resistive to mechanical stresses. The mechanical stresses of the two layers 4 and 5 operate in opposite directions and therefore cancel each other out. In a preferred embodiment, an equilibrium of stresses has been achieved at approximately the following layer thicknesses:

TiN layer 4: 40 nm

Cr layer 5: 50 nm

Figure 2:
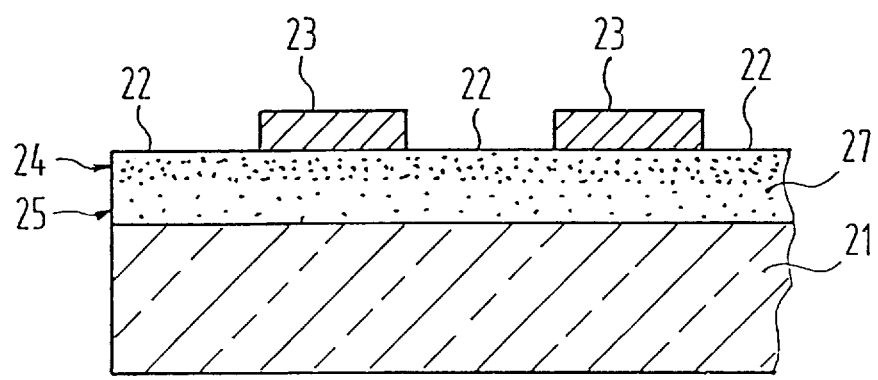
FIG. 2 is a cross-section of a scale with an amplitude grating according to a second preferred embodiment of the present invention.

FIG. 2 is a cross-section of a scale with an amplitude grating according to a second preferred embodiment of the present invention. Reflecting areas 22 and absorbing areas 23 are alternatingly provided on the base body 21 preferably made of glass. As was described with reference to FIG. 1, the absorbing areas 23 are preferably strip-shaped chrome oxide deposits of a known type. The reflecting areas 22 are formed by a layer 27 consisting of physically-chemically in-homogeneous layer areas 24 and 25. The layer areas 24 and 25 of layer 27 are produced by changing the reaction gas pressures during deposition.

In a preferred embodiment, titanium is deposited as the first layer area 25 on the surface of the base body 21 and the reaction gas pressure is increased during deposition so that a second layer area 24 of titanium nitride is formed. The layer areas 24 and 25 obtained in this manner have different physical properties so that stresses in each layer cancel each other out and in the finished state the layer 27 does not exert any stresses on the base body 1.

The gradations of the scales shown in FIGS. 1 and 2 are called amplitude gratings because they affect the amplitude, but not the phase, of the impinging light differently.

FIGS. 3 through 6 illustrate graduations in the form of phase gratings which cause a modulation of the phase position of the incident light waves.

Figure 3:
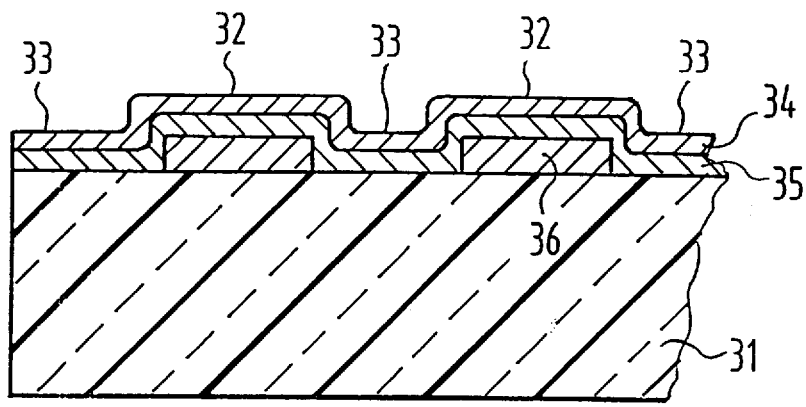
FIG. 3 is a cross-section of a scale with a phase grating according to a third preferred embodiment of the present invention.
Figure 4:
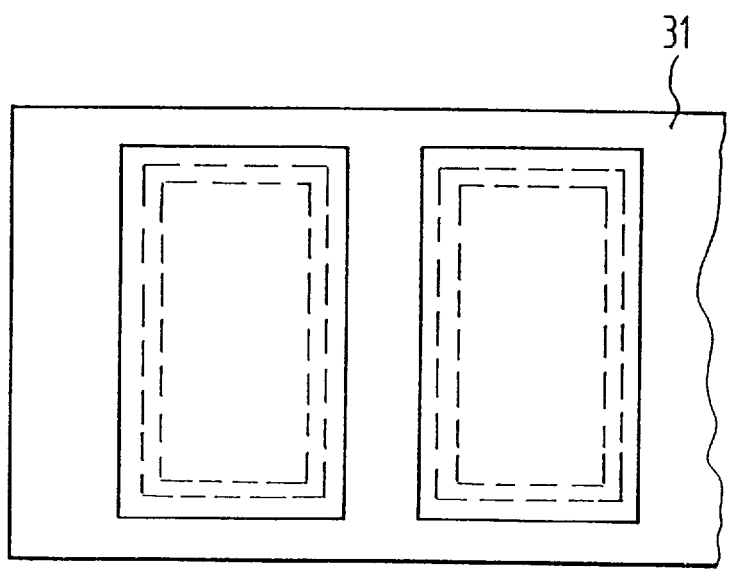
FIG. 4 is a top view of the scale shown in FIG. 3.

FIG. 3 is a cross-section of a scale with a phase grating according to a third preferred embodiment of the present invention. FIG. 4 is a top view of the scale shown in FIG. 3. The scale shown in FIGS. 3 and 4 include a base body 31 on which a step-shaped profile is generated by means of several layers 36, 35 and 34. Bars 36 preferably of chrome, which are separated by a distance from each other, have been deposited on the base body 31. On top of bars 36 is a continuous compensating layer 35. On top of compensating layer 35 is a continuous, highly reflective layer 34 of TiN. The surface of layer 34 has alternating raised areas 32 and stepped areas 33 forming the graduation. Compensating layer 35 prevents tensile stresses in the base body 31 caused by layer 34.

Figure 5:
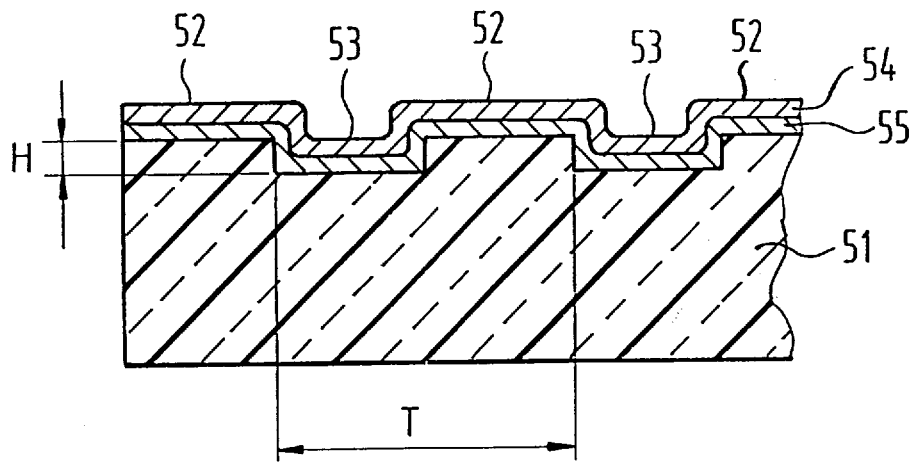
FIG. 5 is a cross-section of a scale with a phase grating according to a fourth preferred embodiment of the present invention.

FIG. 5 is a cross-section of a scale with a phase grating according to a fourth preferred embodiment of the present invention. In the scale shown in FIG. 5, the stepped areas 52 and 53 have been realized by a step-shaped structuring of the base body 51. Structuring of the base body 51, which preferably is made of glass, is preferably performed by HF wet etching or reactive ionic etching. A continuous compensating layer 55 of chrome and, on top of it, again a continuous, reflecting layer 54 of TiN are applied to the base body 51. Both layers 54 and 55 complement each other in such a way that in the finished state of the scale they do not exert any mechanical stresses on base body 51.

At this point the functioning of the phase grating with the raised areas 52 and the stepped areas 53 will be briefly discussed. If parallel light is reflected on the surface of the reflecting layer 54, the partial beams being reflected at the areas 53 travel a longer distance than those reflected by raised areas 52 and thus a phase lag occurs with respect to the partial beams reflected by the raised areas 51. The cycle difference between the partial beams is preferably $\lambda$(lambda) /2. The reflecting partial beams interfere with each other. When the scale is displaced with relation to a scanning unit, the phase positions of the light waves in the different diffraction orders change. After the light beams have interfered, a sinusoidal curve of the light intensity as a function of the displacement path is thus obtained, which is detected by the photo receptors (not shown) and from which position-dependent signals are generated.

In a preferred embodiment, the dimensions of the scale shown in FIG. 5 are:

Thickness of the chrome layer 55: 50 nm

Thickness of the TiN layer 54: 40 nm

Step height H: 220 nm

Gradation period T: 8 $\mu$m

Figure 6:
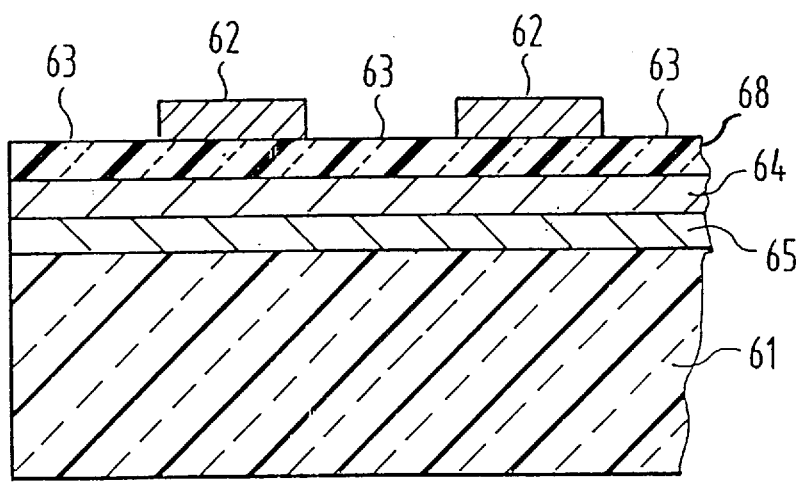
FIG. 6 is a cross-section of a scale with a phase grating according to a fifth preferred embodiment of the present invention.

FIG. 6 is a cross-section of a scale with a phase grating according to a fifth preferred embodiment of the present invention. A continuous compensating layer 65 of chrome and then a continuous reflecting layer 64 of TiN are applied to a base body 61. The gradation is formed by a transparent intermediate layer 68 of magnesium fluoride provided on the reflecting layer 64. Strip-shaped, spaced-apart reflecting bars 62 are deposited on top of transparent layer 68. The raised areas are formed by the bars 62 and the stepped areas 63 by the surface regions of the reflecting layer 64 located between the bars 62. In the finished state of the scale, the stacked layers 64 and 65 prevent stresses from acting on the base body 61.

It is essential in all of the preferred embodiments shown in FIGS. 1–6 that at least two continuous layers, the stresses of which cancel each other out, are provided on one side of the base body. This can be attained in that different materials with different physical properties are used for the layers. Optimization can additionally be provided by the selection of suitable layer thicknesses.

The invention can also be employed particularly advantageously for so-called cross-grating measuring systems in accordance with European Patent Disclosure EP 0 482 224 A1, the disclosure of which is hereby incorporated by reference.

The invention is not limited to linear or angular measuring systems operating by incident light but can also be used with measuring systems operating by transmitted light. If transmitted light is utilized, the layers of the invention are embodied as a sequence of transparent layers.

As previously described, the base body of the scale is preferably made of glass, however, other materials such a plastic or metal, can also be used.

An advantage of the present invention is that the base body is not mechanically deformed by the layers applied on it. Another advantage lies in that the layers can be applied to one side of the base body and that this represents a stack of layers free of internal stress on the base body which is highly adhesive and is not separated from the base body by stress.

While this invention has been shown and described in connection with the preferred embodiments, it is apparent that certain changes and modifications, in addition to those mentioned above, may be made from the basic features of the present invention. Accordingly, it is the intention of the Applicants to protect all variations and modifications within the true spirit and valid scope of the present invention.

What is claimed is:

1. A scale with an amplitude grating formed by alternating reflective and non-reflective areas comprising:

a base body;

a first layer substantially in contact with a first side of the base body;

at least a second layer disposed on top of the first layer, the second layer extending over a substantial area of the base body forming the grating;

wherein the first layer is a compensating layer for isolating the base body from stresses caused by the second layer and the second layer is a reflective layer; and the non-reflective areas are located on top of the second layer.

2. A scale according to claim 1 wherein the first and second layers are formed by a physically inhomogeneous coating.

3. A scale according to claim 2 wherein the inhomogeneous coating includes at least a first layer area of titanium in contact with the base body and a second layer area of titanium nitride formed on the first layer area.

4. A scale according to claim 1 wherein the compensation layer is a chromium layer and the reflecting layer is a titanium nitride layer.

5. A scale comprising:

a base body;

a first layer substantially in contact with a first side of the base body;

a graduation formed by at least a second layer disposed on top of the first layer;

wherein the second layer is a titanium nitride layer and the first layer is a chrome layer for isolating the base body from stresses caused by the second layer.

6. A scale comprising:

a base body;

a first layer substantially in contact with a first side of the base body; and a graduation formed by spaced apart non-reflective areas disposed on a second, reflective layer disposed on top of the first layer, wherein the first layer is a compensating layer for isolating the base body from stresses caused by the second layer and the graduation, including the spaced apart non-reflective areas disposed on the second, reflective layer, and has mechanical stresses which operate in an opposite direction to the mechanical stresses of the second layer.

7. A scale comprising:

a carrier body having a plurality of lands spaced apart by a plurality of gaps wherein one gap separates adjacent lands;

a continuous compensation layer disposed on the plurality of lands and gaps;

a continuous reflective layer disposed on the continuous compensation layer and forming a phase grating;

wherein the continuous compensation layer has mechanical stresses which operate in an opposite direction from the mechanical stresses of the reflective layer, and wherein the continuous compensation layer is a chromium layer and the continuous reflective layer is a titanium nitride layer.

8. A scale comprising:

a base body;

a first layer substantially in contact with a first side of the base body for isolating the base body from stresses caused by an overlying layer;

a graduation formed by at least a second layer disposed on top of the first layer, and a plurality of spaced-apart bars located on and in contact with the first side of the base body to create a stepped surface in the second layer.

9. A scale comprising:

a base body;

a first layer substantially in contact with a first side of the base body for isolating the base body from stresses caused by an overlying layer;

a graduation formed by at least a second layer disposed on top of the first layer, wherein the graduation is a phase grating; and a third layer located on top of the second layer and individual, spaced-apart reflecting areas located on top of the third layer.

10. A scale according to claim 9 wherein the third layer is a transparent layer.

11. A scale according to claim 9 wherein the third layer is magnesium fluoride.

12. A scale according to claim 9 wherein the third layer is a transparent layer.

13. A scale according to claim 9 wherein the third layer is magnesium fluoride.

14. A scale comprising:

a base body;

a first layer substantially in contact with a first side of the base body for isolating the base body from stresses caused by an overlying layer;

a graduation formed by at least a second layer disposed on top of the first layer; and a third layer located on top of the second layer and individual, spaced-apart reflecting areas located on top of the third layer, wherein the first side of the base body has a stepped structure.

\* \* \* \* \*